United States Patent
Bruneau et al.

(10) Patent No.: US 9,205,709 B2
(45) Date of Patent: Dec. 8, 2015

(54) TIRE WITH IMPROVED BEADS

(75) Inventors: Francois-Xavier Bruneau, Clermont-Ferrand (FR); Frederic Bourgeois, Clermont-Ferrand (FR)

(73) Assignees: COMPAGNIE GENERALE DES ETABLISSEMENTS MICHELIN, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 316 days.

(21) Appl. No.: 13/983,002

(22) PCT Filed: Jan. 26, 2012

(86) PCT No.: PCT/EP2012/051224
§ 371 (c)(1),
(2), (4) Date: Sep. 20, 2013

(87) PCT Pub. No.: WO2012/104196
PCT Pub. Date: Aug. 9, 2012

(65) Prior Publication Data
US 2014/0014250 A1    Jan. 16, 2014

Related U.S. Application Data

(60) Provisional application No. 61/480,356, filed on Apr. 28, 2011.

(30) Foreign Application Priority Data

Jan. 31, 2011    (FR) ...................... 11 50715

(51) Int. Cl.
*B60C 15/00*    (2006.01)
*B60C 15/06*    (2006.01)

(52) U.S. Cl.
CPC ............. *B60C 15/0009* (2013.04); *B60C 15/06* (2013.01); *B60C 15/0603* (2013.04)

(58) Field of Classification Search
CPC ............ B60C 15/00; B60C 15/060603; B60C 15/0607
See application file for complete search history.

(56) References Cited

FOREIGN PATENT DOCUMENTS

EP    0 947 358    10/1999
WO    WO 2010/072736    7/2010

*Primary Examiner* — Justin Fischer
(74) *Attorney, Agent, or Firm* — Cozen O'Connor

(57) ABSTRACT

Tire comprising a carcass reinforcement and two beads, each comprising at least one annular reinforcing structure, a bead filler and an outer strip made from a rubber composition having an elastic modulus G' of less than or equal to 15 MPa and a viscous modulus G" such that G" [MPa]≤0.2·G' [MPa]−0.2 MPa, wherein the bead filler has a thickness E(r) perpendicular to the carcass reinforcement with the bead filler, r denoting the distance from the radially innermost point of the annular reinforcing structure, wherein the assembly formed by the bead filler and the outer strip has a thickness ET(r), wherein the thickness ET(r) changes such that, in the range of distances r comprised between 25 and 45% of the height H of the tire, the variation in thickness is less than or equal to −0.25 mm/mm over at least 4% of the height H, wherein, for all the points of which the distance r is greater than 10% and less than 35% of the height H, the ratio E(r)/ET(r) is greater than 0.3 and less than or 0.5, wherein, in any radial section, the bead filler has a cross section of area S1 and the outer strip has a cross section of area S2, the ratio S1/(S1+S2) being greater than 0.4 and less than 0.6, and wherein the annular reinforcing structure has a maximum axial width DE such that the $$\text{ratio} \frac{ET(r)_{max} - DE}{ET(r)_{max}},$$

where $ET(r)_{max}$ is the maximum value of the thickness $ET(r)$, is less than 10%.

8 Claims, 6 Drawing Sheets

TIRE WITH IMPROVED BEADS

RELATED APPLICATIONS

This is a U.S. national stage of application No. PCT/EP2012/051224, filed on Jan. 26, 2012.

This application claims priority of French application Ser. No. 11/50715 filed Jan. 31, 2011, and U.S. provisional application No. 61/480,356 filed on Apr. 28, the content of both of which are hereby incorporated by reference.

FIELD OF THE INVENTION

The present invention relates to tires for passenger vehicles that have a bad index higher than 100, such as most of the tires used for 4×4 vehicles and vans. The invention relates in particular to the beads of these tires.

BACKGROUND

The "load index" of a tire is a parameter well known to those skilled in the art for quantifying the maximum load that the tire is able to bear when mounted on a mounting rim and inflated to its service pressure. A load index of 100 corresponds to a maximum load of 800 kg.

The assembly formed by the bead and the radially inner part of the sidewall of a tire is one of the components of the tire the structure of which has a very marked impact on the endurance of the tire. It performs many roles. For example, it absorbs the tension of the carcass reinforcement and transmits the load to which the tire is subjected from the sidewall to the rim. It therefore guides the crown of the tire from the rim. The influence that it has on the road holding of the tire is considerable, especially when the tire is heavily loaded. In the case of tires for passenger vehicles with a high load index, all of these functions are usually performed by combining a double carcass reinforcement (comprising the bead wire and the turn-up of this double carcass reinforcement about the latter) and a "bead filler" made of rubber composition. The compromise between the rigidity that is to be achieved, particularly for guiding the crown, and the expected endurance generally results in the double carcass reinforcement having to follow a certain path and in the use of a bulky (tall and/or thick) and rigid bead filler. The downside of this geometry is the complexity of the manufacturing process and the cost of the tire. The stiffening action of the bead filler is predominant especially in the region distant from the bead and therefore requires a bead filler that is all the more bulky and, as a result, a manufacturing process that is complex.

The need to reduce the complexity of the manufacturing process and the cost of the tire have led the manufacturers to use a single carcass reinforcement, even for tires with a high load index. The need to maintain a relatively low rolling resistance has made them use less rigid rubber compositions in the bead. The lower rigidity of these rubber compositions is then compensated for by the use of a relatively thick bead filler, possibly combined with an outer strip which is itself thick.

The use of these semi-finished products does nonetheless present a problem in terms of manufacture, because it requires the reels from which these semi-finished products are supplied to be replaced more frequently.

In order to address this problem while at the same time maintaining the performance of the tires concerned, the applicant has conducted research aimed at finding a more sensible distribution of the thickness of the filler on the bead wire and of the outer strip associated therewith.

SUMMARY OF THE INVENTION

One of the objectives of the present invention is to provide a tire that has a high load index, in spite of having just one carcass reinforcement, and satisfactory endurance, while at the same time allowing an increase in manufacturing productivity. This objective is achieved by optimizing the distribution of the thicknesses of the rubber compositions in the bead.

More specifically, this objective is achieved using a tire comprising:

two beads designed to come into contact with a mounting rim, each bead comprising at least one annular reinforcing structure;

two sidewalls extending the beads radially outwards, the two sidewalls meeting in a crown comprising a crown reinforcement surmounted by a tread;

a single carcass reinforcement, extending from the beads, through the sidewalls to the crown, the carcass reinforcement comprising a plurality of carcass reinforcing elements, the carcass reinforcement being anchored in the two beads by a turn-up around the annular reinforcing structure, so as to form, in each bead, a main portion and a wrapped-around portion, each wrapped-around portion extending radially on the outside as far as an end situated at a radial distance DEC from the radially innermost point of the annular reinforcing structure of the bead, the radial distance DEC being greater than or equal to 5% of the radial height H of the tire and less than or equal to 85% (preferably less than or equal to 20%) of the radial height H of the tire.

Each bead comprises a bead filler made of a rubber composition having an elastic modulus $G'$ of less than or equal to 15 MPa and a viscous modulus $G''$ such that:

$$G'' \text{ [MPa]} \leq 0.2 \cdot G' \text{ [MPa]} - 0.2 \text{ MPa},$$

the elastic and viscous modules being measured at 23° C. Rubber compositions of this kind are known, in particular, from the document WO 2010/072736.

The bead filler is situated mostly radially on the outside of the annular reinforcing structure and at least partially between the main portion and the wrapped-around portion of the carcass reinforcement. It extends radially as far as a radially outer end of the bead filler, situated at a radial distance DEE1 from the radially innermost point of the annular reinforcing structure of the bead. The radial distance DEE1 is greater than or equal to 30% (and preferably greater than or equal to 35%) and less than or equal to 50% (and preferably less than or equal to 45%) of the radial height H of the tire.

Each bead further comprises an outer strip (130), made of a rubber composition having an elastic modulus $G'$ of less than or equal to 15 MPa and a viscous modulus $G''$ such that:

$$G'' \text{ [MPa]} \leq 0.2 \cdot G' \text{ [MPa]} - 0.2 \text{ MPa},$$

the elastic and viscous modules being measured at 23° C.

The outer strip is situated axially on the outside of the wrapped-around portion of the carcass reinforcement and extends between a radially inner end of the outer strip and a radially outer end of the outer strip. The radially inner end of the outer strip is situated at a radial distance DEI2 from the radially innermost point of the annular reinforcing structure of the bead, the radial distance DEI2 being greater than or equal to 1% and less than or equal to 5% of the radial height H of the tire. The radially outer end of the outer strip is situated at a radial distance DEE2 from the radially innermost point of the annular reinforcing structure of the bead, the radial distance DEE2 being greater than or equal to 30% (and preferably, greater than or equal to 35%) and less than or equal to 50% (and preferably less than or equal to 45%) of the radial height H of the tire. According to an advantageous embodiment, the radial distance DEE2 is greater than the radial distance DEE1.

The bead filler has a thickness E(r), this thickness corresponding to the length of the intersection of the direction perpendicular to the main portion of the carcass reinforcement with the bead filler, r denoting the distance separating the point of intersection of the said direction perpendicular to the main portion of the carcass reinforcement with the carcass reinforcement from the radially innermost point of the annular reinforcing structure.

The assembly formed by the bead filler and the outer strip has a thickness ET(r), this thickness corresponding to the length of the intersection of the direction perpendicular to the main portion of the carcass reinforcement with the said assembly, r denoting the distance separating the point of intersection of the said direction perpendicular to the main portion of the carcass reinforcement with the carcass reinforcement from the radially innermost point of the annular reinforcing structure, wherein the thickness ET(r) changes such that, in the range of distances r comprised between 25 and 45% of the height H of the tire, the variation in thickness $$\frac{\partial ET(r)}{\partial r}$$

is greater than or equal to −0.25 mm/mm, i.e. the value is below −0.25 mm/mm, (and preferably greater than or equal to −0.3 mm/mm) over at least 4% of the height H of the tire.

For all the points of intersection of the said direction perpendicular to the main portion of the carcass reinforcement with the carcass reinforcement of which the distance r from the radially innermost point of the annular reinforcing structure is greater than or equal to 10% and less than or equal to 35% of the radial height H of the tire, the ratio E(r)/ET(r) is greater than or equal to 0.3 (and preferably greater than or equal to 0.35) and less than or equal to 0.5.

In any radial section, the bead filler has a cross section of area S1 and the outer strip has a cross section of area S2, the ratio S1/(S1+S2) being greater than or equal to 0.4 and less than or equal to 0.6.

Said at least one annular reinforcing structure has a maximum axial width DE such that the ratio $$\frac{ET(r)_{max} - DE}{ET(r)_{max}},$$

where $ET(r)_{max}$ is the maximum value of the thickness ET(r), is less than or equal to 10% (and preferably less than or equal to 7%).

This sizing of the tire has made it possible to increase manufacturing rates without the slightest drop off in tire endurance.

DETAILED DESCRIPTION OF THE DRAWINGS

When using the term "radial" it is appropriate to make a distinction between the various different uses made of this word by those skilled in the art. Firstly, the expression refers to a radius of the tire. It is in this sense that a point P1 is said to be "radially inside" a point P2 (or "radially on the inside of" the point P2) if it is closer to the axis of rotation of the tire than is the point P2. Conversely, a point P3 is said to be "radially outside" a point P4 (or "radially on the outside of" the point P4) if it is further away from the axis of rotation of the tire than is the point P4. Progress will be said to be "radially inwards (or outwards)" when it is in the direction towards smaller (or larger) radii. It is this sense of the term that applies also when matters of radial distances are being discussed.

By contrast, a thread or reinforcement is said to be "radial" when the thread or the reinforcing elements of the reinforcement make an angle greater than or equal to 80° and less than or equal to 90° with the circumferential direction. Let us specify that, in this document, the term "thread" is to be understood in a very general sense and comprises threads in the form of monofilaments, multifilaments, cords, yarns or equivalent assemblies, irrespective of the material of which the thread is made or of the surface treatment it has received in order to enhance its bonding with the rubber.

Finally, a "radial section" or "radial cross section" here means a section or cross section on a plane containing the axis of rotation of the tire.

An "axial" direction is a direction parallel to the axis of rotation of the tire. A point P5 is said to be "axially inside" a point P6 (or "axially on the inside of" the point P6) if it is closer to the mid-plane of the tire than is the point P6. Conversely, a point P7 is said to be "axially outside" a point P8 (or "axially on the outside of" the point P8) if it is further from the mid-plane of the tire than is the point P8. The "mid-plane" of the tire is the plane which is perpendicular to the axis of rotation of the tire and which lies at equal distances from the annular reinforcing structures of each bead.

A "circumferential" direction is a direction which is perpendicular both to a radius of the tire and to the axial direction.

In the context of this document, the expression "rubber composition" denotes a rubber composition containing at least one elastomer and a filler.

Figure 1:
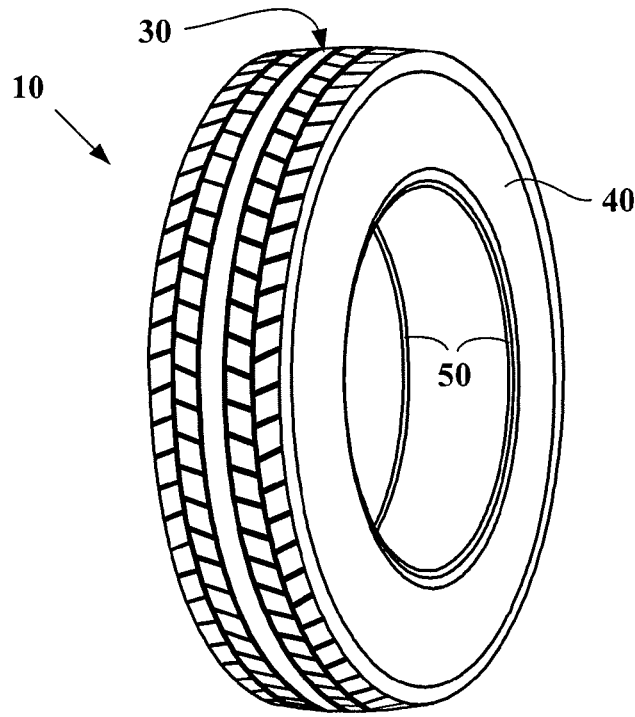
FIG. 1 depicts a tire according to the prior art.

FIG. 1 schematically depicts a tire 10 according to the prior art. The tire 10 comprises a crown comprising a crown reinforcement (not visible in FIG. 1) surmounted by a tread 30, two sidewalls 40 extending the crown radially inwards, and two beads 50 radially on the inside of the sidewalls 40.

Figure 2:
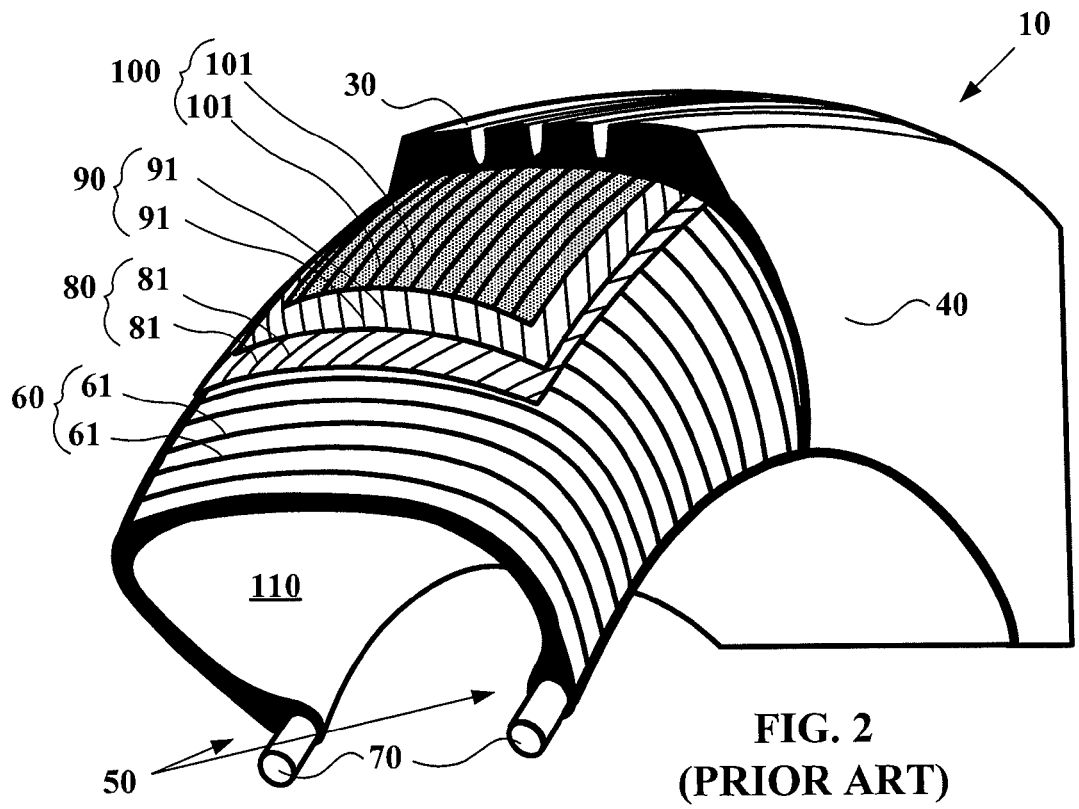
FIG. 2 depicts a partial perspective view of a tire according to the prior art.

FIG. 2 schematically depicts a partial perspective view of another tire 10 according to the prior art and illustrates the various components of the tire. The tire 10 comprises a carcass reinforcement 60 consisting of threads 61 coated with rubber composition, and two beads 50 each comprising circumferential reinforcements 70 (in this case, bead wires) which hold the tire 10 on the rim (not depicted). The carcass reinforcement 60 is anchored in each of the beads 50. The tire 10 further comprises a crown reinforcement comprising two plies 80 and 90. Each of the plies 80 and 90 is reinforced with filamentary reinforcing elements 81 and 91 which are parallel within each layer and crossed from one layer to the next, making angles of between 10° and 70° with the circumferential direction. The tire further comprises a hooping reinforcement 100 arranged radially on the outside of the crown reinforcement, this hooping reinforcement being formed of circumferentially directed and spiral wound reinforcing elements 101. A tread 30 is laid on the hooping reinforcement; it is this tread 30 which provides contact between the tire 10 and the road. The tire 10 depicted is a "tubeless" tire: it comprises an "inner liner" 110 made of a rubber composition that is impervious to the inflating gas, covering the interior surface of the tire.

Figure 3:
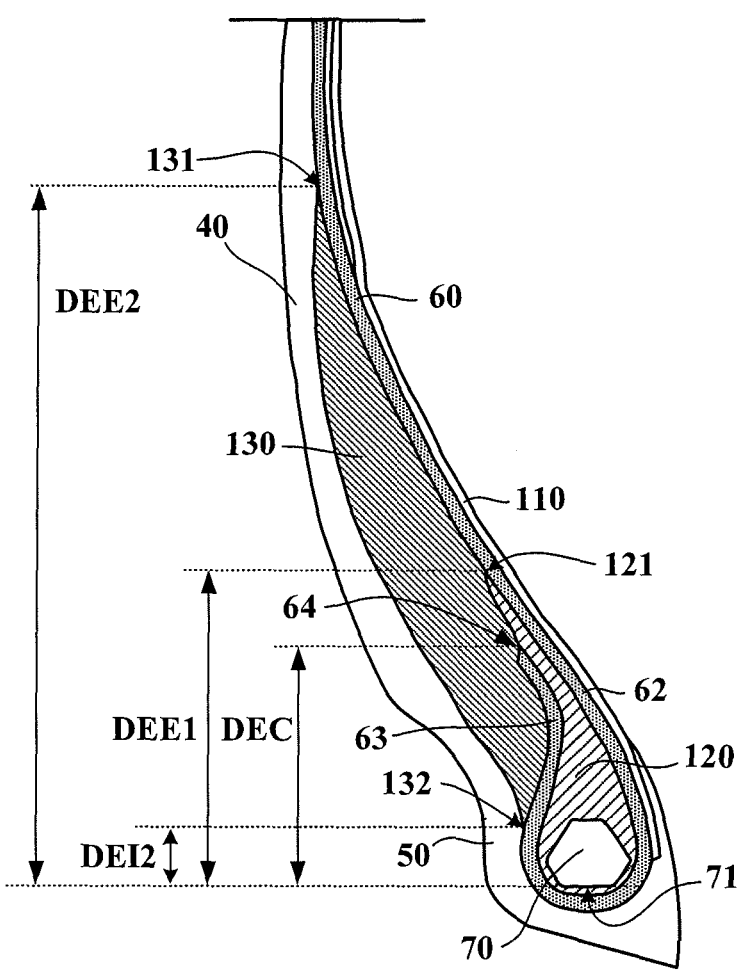
FIG. 3 depicts, in radial section, one quarter of a reference tire.

FIG. 3 schematically, in radial section, depicts a portion of a reference tire. This tire comprises two beads 50 (only one of which is depicted) designed to come into contact with a mounting rim (not depicted), each bead 50 comprising an annular reinforcing structure, in this instance a bead wire 70. Two sidewalls 40 extend the beads 50 radially outwards and meet in a crown (not depicted) comprising a crown reinforcement radially surmounted by a tread.

The tire further comprises a carcass reinforcement 60 which extends from the beads 50 through the sidewalls 40 as far as the crown. This carcass reinforcement 60 here comprises filamentary reinforcements directed substantially radially, that is to say which make an angle greater than or equal to 80° and less than or equal to 90° with the circumferential direction.

The carcass reinforcement 60 comprises a plurality of carcass reinforcing elements. It is anchored in the two beads 50 by a turn-up around the bead wire 70, so as to form, in each bead, a main portion 62 and a wrapped-around portion 63. The wrapped-around portion extends radially on the outside as far as an end 64 situated at a radial distance DEC from the radially innermost point 71 of the annular reinforcing structure of the bead, the radial distance DEC here being equal to 14% of the radial height H of the tire.

Figure 4:
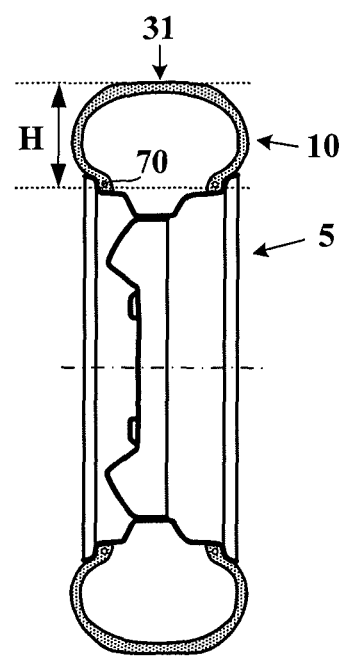
FIG. 4 illustrates how the height H of a tire is determined.

The "radial height" H of a tire is defined as being the radial distance between the radially innermost point 71 of the annular reinforcing structure 70 of the bead 50 and the point 31 (FIG. 4) that is the radially outermost point of the tread 30 when the tire is mounted on a mounting rim 5 (as depicted in FIG. 4) and inflated to its service pressure.

Each bead comprises a bead filler 120, the bead filler being situated radially on the outside of the bead wire 70 and, for a good proportion thereof, between the main portion 62 and the wrapped-around portion 63 of the carcass reinforcement 60.

The bead filler 120 extends radially on the outside of the radially innermost point 71 of the annular reinforcing structure of the bead, as far as a radial distance DEE1 from the said point, the radial distance DEE1 being equal to 18% of the radial height H of the tire.

Each bead 50 further comprises an outer strip 130 made of a rubber composition and situated axially on the outside of the wrapped-around portion 63 of the carcass reinforcement 60, the outer strip 130 extending between a radially inner end 132 and a radially outer end 131, the radially inner end 132 of the outer strip 130 being situated at a radial distance DEI2 from the radially innermost point 71 of the annular reinforcing structure 70. The radial distance DEI2 here is equal to 4% of the radial height H. The radially outer end 131 of the outer strip 130 is situated at a radial distance DEE2 from the radially innermost point 71 of the annular reinforcing structure 70. The radial distance DEE2 here is equal to 41% of the radial height H.

As in this case, the radial distance DEE2 is preferably greater than the radial distance DEE1, particularly when the rubber composition used to form the bead filler 120 contains cobalt salts, as this increases the cost by comparison with the rubber composition used to form the outer strip 130.

The interior surface of the tire is covered with an inner liner 110.

Figures 5, 6:
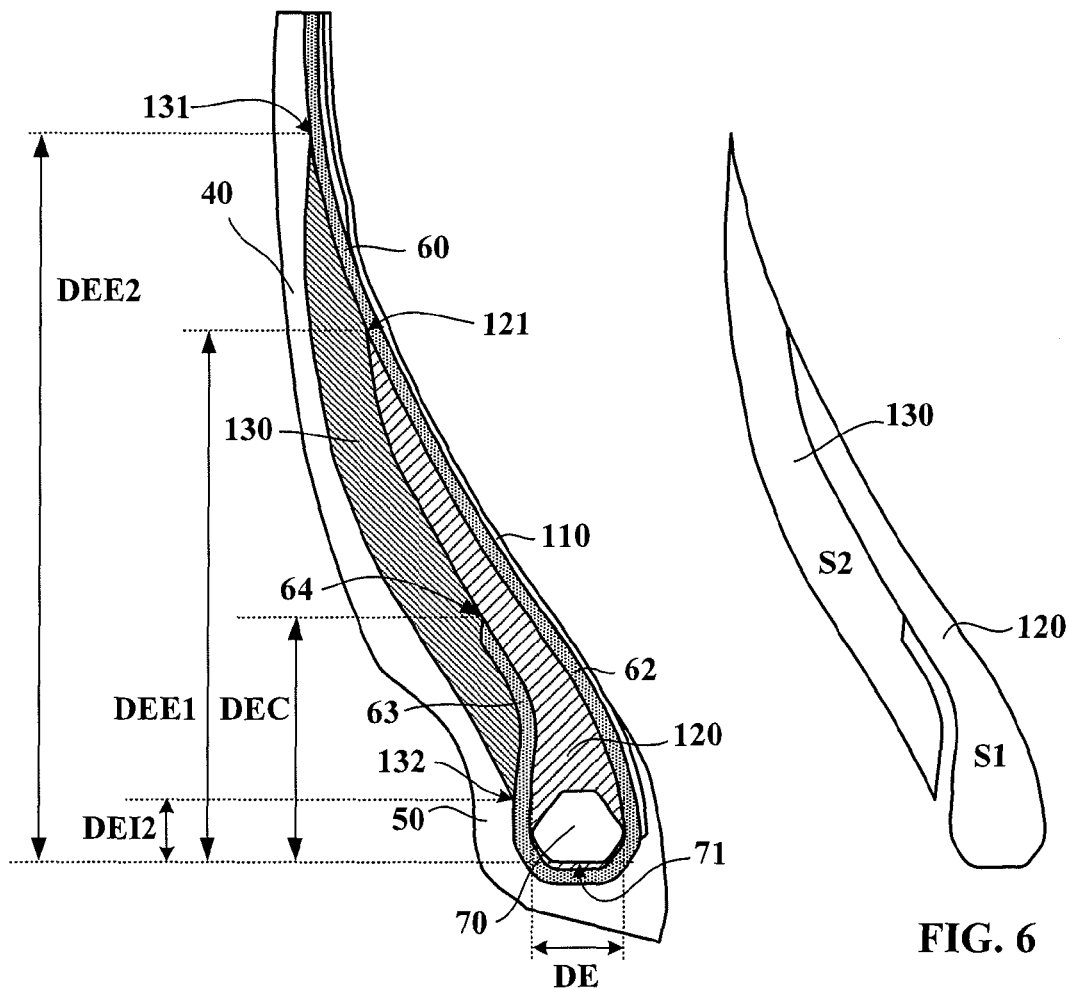
FIG. 5 depicts, in radial section, one quarter of a tire according to an embodiment of the invention.
FIG. 6 depicts a detail of FIG. 5.

FIG. 5 depicts, in radial section, a portion of a tire according to an embodiment of the invention. This tire comprises:
two beads 50 (only one of which is depicted) designed to come into contact with a mounting rim (not depicted), each bead comprising an annular reinforcing structure 70;
two sidewalls 40 extending the beads radially outwards, the two sidewalls meeting in a crown (not depicted) comprising a crown reinforcement surmounted by a tread;
a single carcass reinforcement 60, extending from the beads 50, through the sidewalls 40 to the crown, the carcass reinforcement 60 comprising a plurality of carcass reinforcing elements, the carcass reinforcement being anchored in the two beads by a turn-up around the annular reinforcing structure, so as to form, in each bead, a main portion 62 and a wrapped-around portion 63, each wrapped-around portion extending radially on the outside as far as an end 64 situated at a radial distance DEC from the radially innermost point 71 of the annular reinforcing structure 70 of the bead 50. The radial distance DEC is greater than or equal to 5% of the radial height H of the tire and less than or equal to 85% of the radial height H of the tire; in this particular instance, the radial distance DEC is equal to 14% of the radial height H of the tire.

Each bead 50 comprises a bead filler 120 made of a rubber composition having an elastic modulus G' of less than or equal to 15 MPa and a viscous modulus G" such that:

$$G'' \text{ [MPa]} \leq 0.2 \cdot G' \text{ [MPa]} - 0.2 \text{ MPa},$$

the elastic and viscous modules being measured at 23° C. Rubber compositions of this kind are known, for example, from the document WO 2010/072736. The bead 50 is situated mostly radially on the outside of the annular reinforcing structure 70 and at least partially between the main portion 62 and the wrapped-around portion 63 of the carcass reinforcement. When it is said that the bead filler 120 is situated "mostly" radially on the outside of the annular reinforcing structure 70, that should be interpreted as meaning that a small part of the bead filler may extend around the annular reinforcing structure 70 and, as a result, lie radially on the inside thereof, but that the majority (typically at least 80% of the surface area of the bead filler in any radial cross section) lies radially on the outside of the annular reinforcing structure 70. The bead filler 120 extends radially as far as a radially outer end 121 of the bead filler, the radially outer end 121 of the bead filler being situated at a radial distance DEE1 from the radially innermost point 71 of the annular reinforcing structure of the bead, the radial distance DEE1 being greater than or equal to 30% and less than or equal to 50% of the radial height H of the tire. In this particular instance, the radial distance DEE1 is equal to 33% of the radial height H of the tire.

Each bead further comprises an outer strip 130 made of a rubber composition having an elastic modulus G' of less than or equal to 15 MPa and a viscous modulus G" such that:

$$G'' \text{ [MPa]} \leq 0.2 \cdot G' \text{ [MPa]} - 0.2 \text{ MPa},$$

the elastic and viscous modules being measured at 23° C.

Table I gives, by way of example, the recipe for two rubber compositions that may be used to form an outer strip suitable for a tire according to an embodiment of the invention. The composition is given in phr ("per hundred rubber"), that is to say in parts by weight per 100 parts by weight of rubber. The corresponding dynamic modules are also indicated.

TABLE I

| Parts in phr | Composition 1 | Composition 2 |
|---|---|---|
| NR [1] | 100 | 100 |
| N 990 | 85 | 85 |
| Graphite | 40 | |
| Antioxidant (6PPD) [2] | 2 | 2 |
| Cobalt naphthenate | 3 | 3 |
| Stearic acid | 1 | 1 |
| ZnO | 7 | 7 |
| Sulfur | 7 | 7 |
| Accelerator (TBBS) [3] | 1 | 1 |
| G' | 5 | 2 |
| G" | 0.8 | 0.2 |

Notes for Table 1:
[1] Natural rubber
[2] N-(1,3-dimethylbutyl)-N'-phenyl-p-phenylenediamine
[3] N-tert-butyl-2-benzothiazyl sulfonamide The rubber composition is preferably based on at least one diene elastomer, a reinforcing filler and a crosslinking system.

What is meant by a "diene" elastomer (interchangeable with rubber) is, in the known way, an elastomer derived at least in part (i.e. a homopolymer or a copolymer) from diene monomers, i.e. monomers which have two carbon-carbon double bonds, which may or may not be conjugated bonds. The diene elastomer used is preferably chosen from the group consisting of polybutadienes (BR), natural rubber (NR), synthetic polyisoprenes (IR), butadiene-styrene copolymers (SBR), isoprene-butadiene copolymers (BIR), isoprene-styrene copolymers (SIR), butadiene-styrene-isoprene copolymers (SBIR) and mixtures of these elastomers.

One preferred embodiment consists in using an "isoprene" elastomer, that is to say a homopolymer or a copolymer of isoprene, or in other words a diene elastomer chosen from the group consisting of natural rubber (NR), synthetic polyisoprenes (IR), the various copolymers of isoprene and mixtures of these elastomers.

The isoprene elastomer is preferably natural rubber or synthetic polyisoprene of the cis-1,4 type. Of the synthetic polyisoprenes, those used for preference are polyisoprenes that have a ratio (molar %) of cis-1,4 bonds in excess of 90%, more preferably still in excess of 98%. According to other preferred embodiments, the diene elastomer may consist, fully or in part, of some other diene elastomer such as, for example, SBR elastomer (E-SBR or S-SBR) used either cut with some other elastomer, for example of the BR type, or uncut.

The rubber composition may also contain all or some of the additives customarily used in rubber matrices that are appropriate for the manufacture of tires, such as, for example, reinforcing fillers such as carbon black or inorganic fillers such as silica, coupling agents for inorganic fillers, anti-aging agents, antioxidants, plasticizing agents or extender oils, whether the latter be of the aromatic or non-aromatic kind (notably oils that are very weakly aromatic or non-aromatic, for example of the napthene or paraffin type, with a high or preferably a low viscosity, MES or TDAE oils, plasticizing resins with a high $T_g$ in excess of 30° C.), processing aids that make the compositions easier to process in the raw state, tackifying resins, a crosslinking system based either on sulfur or on sulfur donors, and/or on peroxide, accelerators, vulcanization activators or retarders, anti-reversion agents, methylene acceptors and donors such as HMT (hexamethylenetetramine) or H3M (hexamethoxymethylmelamine) for example, reinforcing resins (such as resorcinol or bismaleimide), known adhesion promoting systems of the metallic salts type for example, notably cobalt or nickel salts.

The compositions are manufactured in suitable mixers using two successive phases of preparation well known to those skilled in the art: a first phase of thermomechanical kneading or work (the so-called "non-productive" phase) carried out at high temperature, up to a maximum temperature comprised between 110° C. and 190° C., preferably between 130° C. and 180° C., followed by a second phase of mechanical work (the so-called "productive" phase) up to a lower temperature, typically below 110° C., during which finishing phase the crosslinking system is incorporated.

By way of example, the non-productive phase is carried out in a single thermomechanical step lasting a few minutes (for example between 2 and 10 min) during which all the basic components needed together with other additives with the exception of the crosslinking or vulcanizing system are introduced into an appropriate mixer such as a customary internal mixer. Once the composition thus obtained has cooled, the vulcanizing system is then incorporated in an external mixer such as an open mill kept at low temperature (for example between 30° C. and 100° C.). Everything is then mixed (productive phase) for a few minutes (for example between 5 and 15 min).

The final composition thus obtained is then calendered, for example rolled into the form of a sheet or slab for characterizing, or alternatively is extruded to form the outer strip used in a tire according to an embodiment of the invention.

Vulcanizing (or curing) can then take place in the known manner at a temperature generally comprised between 130° C. and 200° C., preferably under pressure, for a long enough length of time that may vary for example between 5 and 90 min notably depending on the curing temperature, on the vulcanization system adopted and on the vulcanization kinetics of the composition in question.

The outer strip 130 is situated axially on the outside of the wrapped-around portion 63 of the carcass reinforcement 60, the outer strip extending between a radially inner end 132 of the outer strip and a radially outer end 131 of the outer strip, the radially inner end 132 of the outer strip 130 being situated at a radial distance DEI2 from the radially innermost point 71 of the annular reinforcing structure 70 of the bead 50. The radial distance DEI2 is greater than or equal to 1% and less than or equal to 5% of the radial height H of the tire; in this particular instance, it is equal to 4% of the radial height H. The radially outer end 131 of the outer strip 130 is situated at a radial distance DEE2 from the radially innermost point 71 of the annular reinforcing structure 70 of the bead. The radial distance DEE2 is greater than or equal to 30% and less than or equal to 50% of the radial height H of the tire. In this particular instance it is equal to 41% of the radial height H.

In any radial cross section, the bead filler 120 has a cross section of area S1 and the outer strip 130 has a cross section of area S2 (see FIG. 6). The ratio S1/(S1+S2) is greater than or equal to 0.4 and less than or equal to 0.6. In this particular instance, it is equal to 0.6. The radially outer end 121 of the bead filler 120 and the radially outer end 131 of the outer strip 130 are preferably close to one another i.e. at a distance preferably less than or equal to 5 mm.

The bead filler 120 has a thickness E(r), this thickness corresponding to the length of the intersection of the direction perpendicular to the main portion 62 of the carcass reinforcement 60 with the bead filler 120, r denoting the distance separating the point of intersection of the said direction perpendicular to the main portion 62 of the carcass reinforcement 60 with the carcass reinforcement 60 from the radially innermost point 71 of the annular reinforcing structure 70.

The assembly formed by the bead filler 120 and the outer strip 130 has a thickness ET(r). This thickness corresponding to the length of the intersection of the direction perpendicular to the main portion 62 of the carcass reinforcement 60 with the said assembly, r being as defined above.

Figure 7:
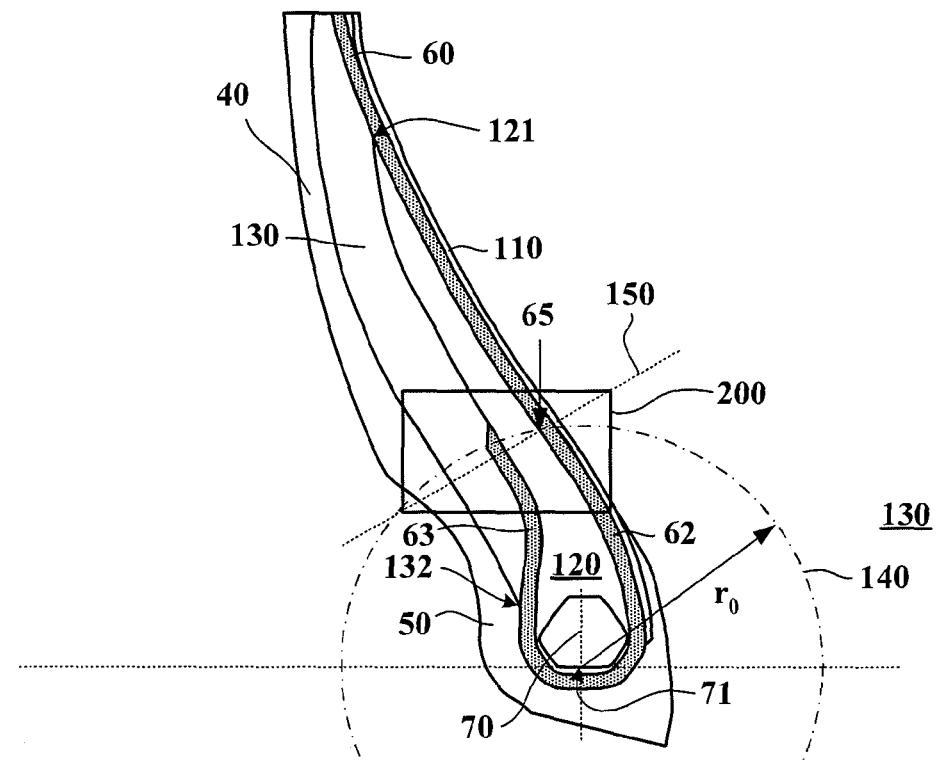
FIGS. 7 and 8 illustrate how the change of the thickness of certain portions of the bead of a tire according to an embodiment of the invention are determined.
Figure 8:
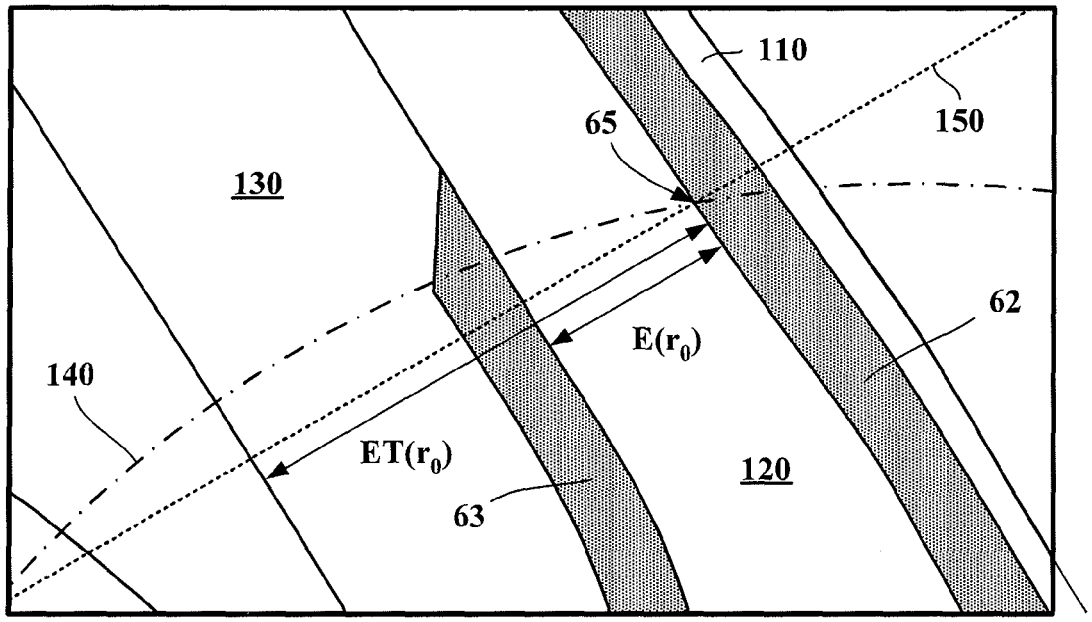

FIGS. 7 and 8 illustrate how these thicknesses are determined. FIG. 8 corresponds to an enlargement of the region contained in box 200 of FIG. 7. The interface between the main portion 62 of the carcass reinforcement 60 and the bead filler 120 is tracked. Each point of this interface has a distance r from the radially innermost point 71 of the annular reinforcing structure 70. If there are several radially innermost points of the annular reinforcing structure, then any arbitrary one of these points is chosen as the reference point. For a given distance $r_0$, the corresponding point 65 of the interface is obtained by drawing a circle 140 of radius $r_0$ about the radially innermost point 71 of the annular reinforcing structure 70, as depicted in FIG. 7. Then the direction 150 perpendicular to the main portion 62 of the carcass reinforcement 60 and which passes through the point 65 of the interface is drawn. The thickness $E(r_0)$ of the bead filler 120 corresponds to the length of the intersection of the direction 150 with the bead filler 120. Likewise, the thickness $ET(r_0)$ of the assembly formed by the bead filler 120 and the outer strip 130 corresponds to the length of the intersection of the direction 150 with this assembly. The thickness of the wrapped-around portion 63 is not taken into consideration if the direction 150 intersects therewith.

In a tire according to the invention, for all the points of intersection 65 of the said direction 150 perpendicular to the main portion 62 of the carcass reinforcement 60 with the carcass reinforcement 60 of which the distance r from the radially innermost point 71 of the annular reinforcing structure 70 is greater than or equal to 10% and less than or equal to 35% of the radial height H of the tire, the ratio E(r)/ET(r) is greater than or equal to 0.3 (and preferably greater than or equal to 0.35) and less than or equal to 0.5.

Furthermore, the annular reinforcing structure 70 has a maximum axial width DE (see FIG. 5) such that the ratio $$\frac{ET(r)_{max} - DE}{ET(r)_{max}},$$

where $ET(r)_{max}$ is the maximum value of the thickness ET(r), is less than or equal to 10%. In this instance, this ratio is equal to 7%.

The invention is not restricted to one particular type of bead wire. It can be implemented with braided bead wires, but can also be implemented with "bead bundles" using round wire (as disclosed, by way of example in document CA 2 026 024) or square wire (document U.S. Pat. No. 3,949,800 represents one example of this), made up of an individual wire or strand coated with rubber, wound in a helix with contiguous turns stacked on one another, the plurality of superposed layers forming an endless reinforcing annulus of polygonal cross section. The use of bead wires like those disclosed in document WO 01/54929, and more particularly of 3-4-3-2 construction has proven to be particularly advantageous because it allows the wire to be sufficiently engineered without any unnecessary addition of mass.

Figure 9:
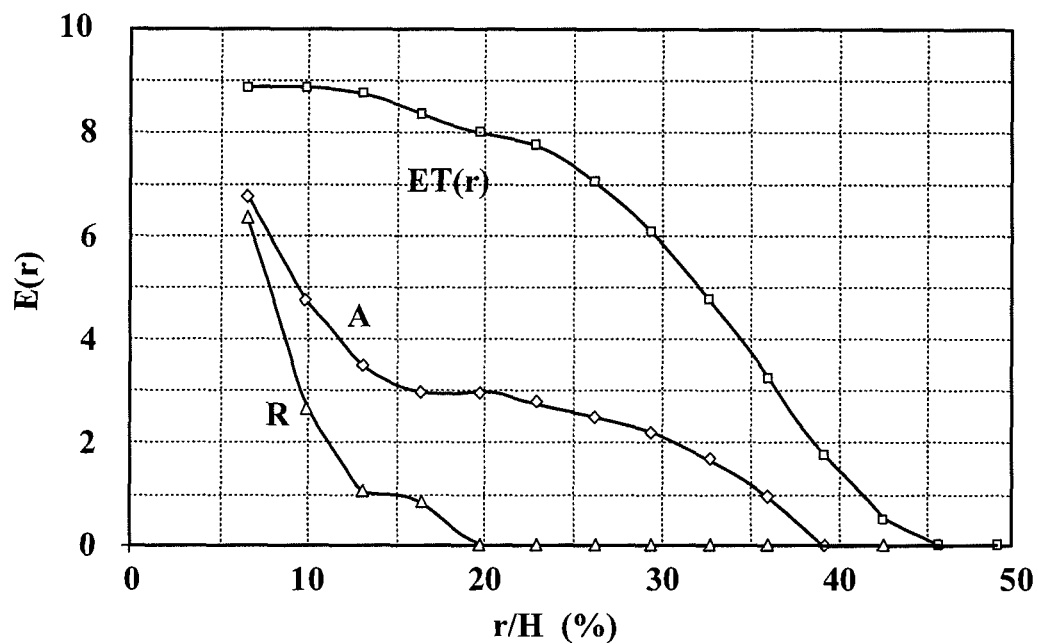
FIGS. 9 to 11 depict the change of the thickness of certain portions of the bead of a tire according to an embodiment of the invention and of a reference tire.

FIG. 9 depicts the change of the thickness E(r) as a function of the distance r for two bead geometries. Geometry "A" (symbol: diamond) corresponds to a tire according to an embodiment of the invention, like the one depicted in FIG. 5. Geometry "R" (symbol: triangle) corresponds to a reference tire like the one depicted in FIG. 3. The total thickness ET(r) is the same for both geometries. It is also indicated in FIG. 9 (symbol: square).

Figure 10:
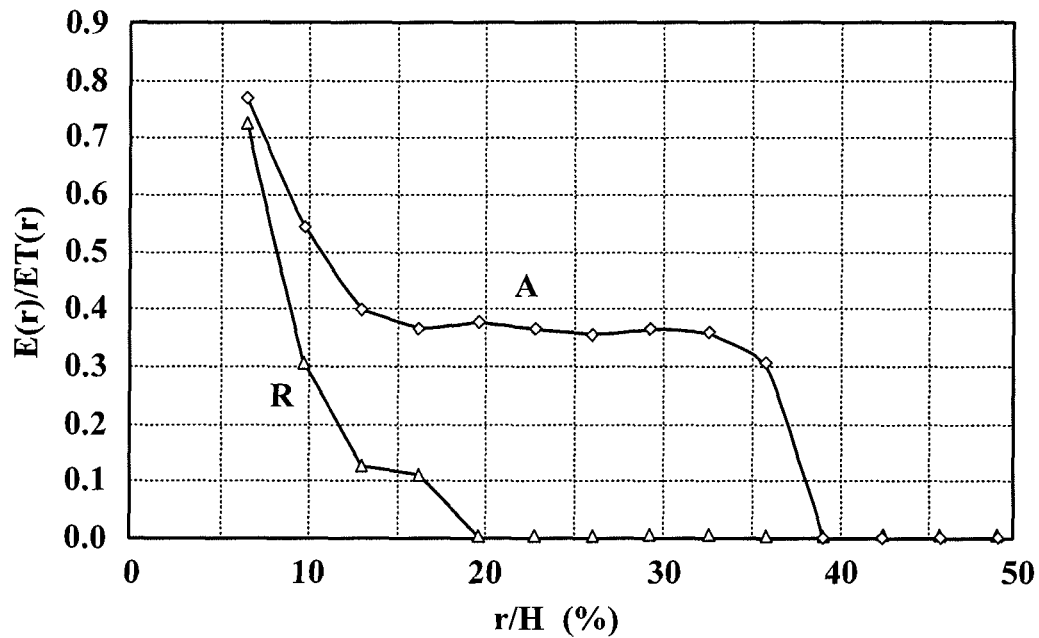

FIG. 10 represents the ratio E(r)/ET(r) as a function of the ratio r/H for the same two bead geometries. It can be seen that, for the tire according to an embodiment of the invention (geometry "A"), for all r/H values between 10% and 35%, the ratio E(r)/ET(r) is greater than or equal to 0.3 and less than or equal to 0.5, whereas the ratio for the reference tire (geometry "R") is far lower at the same r-values.

Figure 11:
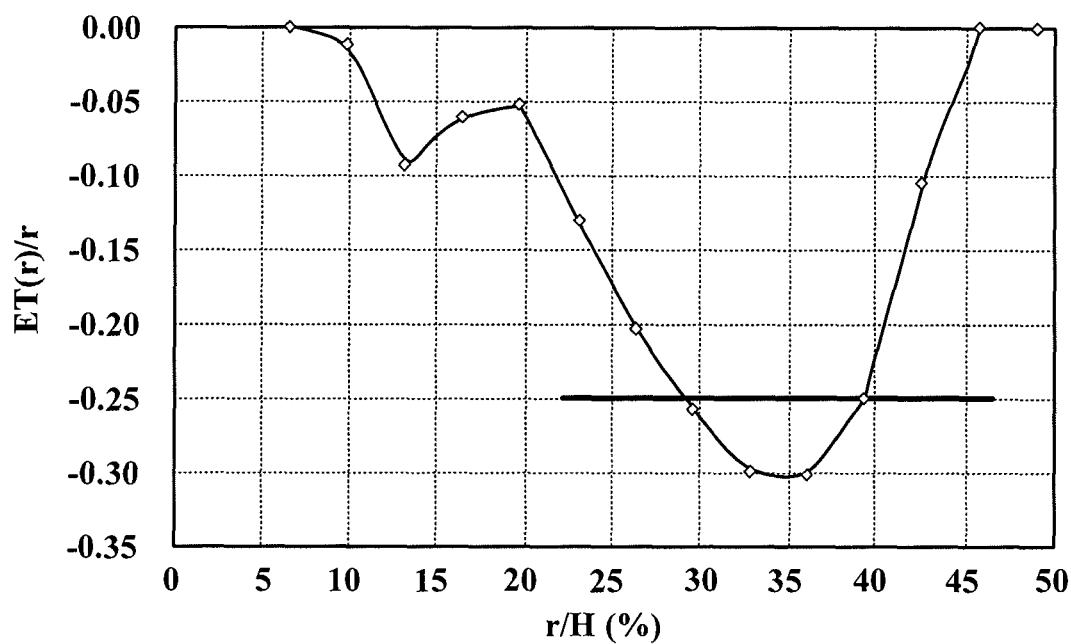

Consider again the function $$\frac{\partial ET(r)}{\partial r}$$

as a function of the radius r, as is depicted in FIG. 11. In a tire according to the invention, the thickness ET(r) changes such that, in the range of distances r comprised between 25 and 45% of the height H of the tire, the variation in thickness $$\frac{\partial ET(r)}{\partial r}$$

is greater than or equal to −0.25 mm/mm i.e., the value is below −0.25 mm/mm over at least 4% of the height H of the tire. In this instance, it is greater than or equal to −0.25 mm/mm over close to 10% of the height H of the tire.

The applicant has conducted comparative tests on tires of 235/65 R 17 size. A tire with a bead as depicted in FIG. 3 was compared with a tire with a bead as depicted in FIG. 5. The two tires had the same cornering stiffness and the same rolling resistance. The tire according to an embodiment of the invention allowed an improvement in manufacturing productivity (number of compliant tires produced per unit time) of around 20% over the tire according to the prior art. This improvement can be explained particularly by a reduction in the frequency at which the reels of semi-finished product have to be changed. No difference in terms of tire endurance was noted.

The invention claimed is:
1. A tire comprising:
two beads designed to come into contact with a mounting rim, each bead comprising at least one annular reinforcing structure;
two sidewalls extending the beads radially outwards, the two sidewalls meeting in a crown comprising a crown reinforcement surmounted by a tread;
a single carcass reinforcement, extending from the beads, through the sidewalls to the crown, the carcass reinforcement comprising a plurality of carcass reinforcing elements, the carcass reinforcement being anchored in the two beads by a turn-up around the annular reinforcing structure, so as to form, in each bead, a main portion and a wrapped-around portion, each wrapped-around portion extending radially on the outside as far as an end situated at a radial distance DEC from the radially innermost point of the annular reinforcing structure of the bead, the radial distance DEC being greater than or equal to 5% of the radial height H of the tire and less than or equal to 85% of the radial height H of the tire;

wherein each bead comprises a bead filler made of a rubber composition and situated mostly radially on the outside of the annular reinforcing structure and at least partially between the main portion and the wrapped-around portion of the carcass reinforcement, the bead filler extending radially as far as a radially outer end of the bead filler, the radially outer end of the bead filler being situated at a radial distance DEE1 from the radially innermost point of the annular reinforcing structure of the bead, the radial distance DEE1 being greater than or equal to 30% and less than or equal to 50% of the radial height H of the tire, wherein each bead further comprises an outer strip, made of a rubber composition and situated axially on the outside of the wrapped-around portion of the carcass reinforcement, the outer strip extending between a radially inner end of the outer strip and a radially outer end of the outer strip, the radially inner end of the outer strip being situated at a radial distance DE12 from the radially innermost point of the annular reinforcing structure of the bead, the radial distance DE12 being greater than or equal to 1% and less than or equal to 5% of the radial height H of the tire, the radially outer end of the outer strip being situated at a radial distance DEE2 from the radially innermost point of the annular reinforcing structure of the bead, the radial distance DEE2 being greater than or equal to 30% and less than or equal to 50% of the radial height H of the tire, wherein the rubber compositions which form the bead filler and the outer strip have an elastic modulus G' of less than or equal to 15 MPa and a viscous modulus G" such that:

$$G'' \ [MPa] < 0.2 \cdot G' \ [MPa] = 0.2 \ MPa,$$

the elastic and viscous modules being measured at 23° C., wherein the bead filler has a thickness E(r), this thickness corresponding to the length of the intersection of the direction perpendicular to the main portion of the carcass reinforcement with the bead filler, r denoting the distance separating the point of intersection of the said direction perpendicular to the main portion of the carcass reinforcement with the carcass reinforcement from the radially innermost point of the annular reinforcing structure, wherein the assembly formed by the bead filler and the outer strip has a thickness ET(r), this thickness corresponding to the length of the intersection of the direction perpendicular to the main portion of the carcass reinforcement with the said assembly, r denoting the distance separating the point of intersection of the said direction perpendicular to the main portion of the carcass reinforcement with the carcass reinforcement from the radially innermost point of the annular reinforcing structure, wherein the thickness ET(r) changes such that, in the range of distances r comprised between 25 and 45% of the height H of the tire, the variation in thickness $$\frac{ET(r)_{max} - DE}{ET(r)_{max}}$$

is greater than or equal to 0.25 mm/mm over at least 4% of the height H of the tire, wherein, for all the points of intersection of the said direction perpendicular to the main portion of the carcass reinforcement with the carcass reinforcement of which the distance r from the radially innermost point of the annular reinforcing structure is greater than or equal to 10% and less than or equal to 35% of the radial height H of the tire, the ratio E(r)/ET(r) is greater than or equal to 0.3 and less than or equal to 0.5;

wherein, in any radial section, the bead filler has a cross section of area S1 and the outer strip has a cross section of area S2, the ratio S1/(S1+S2) being greater than or equal to 0.4 and less than or equal to 0.6, and wherein said at least one annular reinforcing structure has a maximum axial width DE such that the ratio $$\frac{ET(r)_{max} - DE}{ET(r)_{max}}$$

where $ET(r)_{max}$ is the maximum value of the thickness ET(r), is less than or equal to 10%.

2. The tire of claim 1, wherein the radial distance DEC is greater than or equal to 5% of the radial height H of the tire and less than or equal to 20% of the radial height H of the tire.

3. The tire of claim 1, wherein the radial distance DEE2 is greater than or equal to 35% and less than or equal to 45% of the radial height H of the tire.

4. The tire of claim 1, wherein the radial distance DEE1 is greater than or equal to 35% and less than or equal to 45% of the radial height H of the tire.

5. The tire of claim 1, wherein, for all the points of intersection of the said direction perpendicular to the main portion of the carcass reinforcement with the carcass reinforcement of which the distance r from the radially innermost point of the annular reinforcing structure is greater than or equal to 10% and less than or equal to 35% of the radial height H of the tire, the ratio E(r)/ET(r) is greater than or equal to 0.35 and less than or equal to 0.5.

6. The tire of claim 1, wherein, in the range of distances r comprised between 25 and 45% of the height H of the tire, the variation in the thickness is greater than or equal to 0.3 mm/mm over at least 4% of the height H of the tire.

7. The tire of claim 1, wherein the ratio $$\frac{ET(r)_{max} - DE}{ET(r)_{max}}$$

is less than or equal to 7%.

8. The tire of claim 1, wherein the radial distance DEE2 is greater than the radial distance DEE1.

* * * * *